US012602563B2

(12) United States Patent
Schena et al.

(10) Patent No.: US 12,602,563 B2
(45) Date of Patent: Apr. 14, 2026

(54) RADIO FREQUENCY (RF) POWER CONDITIONING FOR WAKE-UP CIRCUIT

(71) Applicant: Position Imaging, Inc., Portsmouth, NH (US)

(72) Inventors: Drew Anthony Schena, Manchester, NH (US); John Liu, Madbury, NH (US); Ethan A. Smith, Newburyport, MA (US)

(73) Assignee: Position Imaging IP LLC, Portsmouth, NH (US)

( * ) Notice: Subject to any disclaimer, the term of this patent is extended or adjusted under 35 U.S.C. 154(b) by 14 days.

(21) Appl. No.: 18/530,509

(22) Filed: Dec. 6, 2023

(65) Prior Publication Data

US 2024/0185018 A1 Jun. 6, 2024

Related U.S. Application Data

(60) Provisional application No. 63/430,592, filed on Dec. 6, 2022.

(51) Int. Cl.
G06K 19/07 (2006.01)
H04B 5/79 (2024.01)

(52) U.S. Cl.
CPC ........... G06K 19/0702 (2013.01); H04B 5/79 (2024.01)

(58) Field of Classification Search
CPC ... G06K 19/0702; G06K 19/0705; H04B 5/79
See application file for complete search history.

(56) References Cited

U.S. PATENT DOCUMENTS

| | | | |
|---|---|---|---|
| 11,107,337 B2 | 8/2021 | Hill et al. | |
| 11,922,246 B2 | 3/2024 | Hill et al. | |
| 2007/0205873 A1* | 9/2007 | Mickle | G06K 19/0712 |
| | | | 340/10.33 |
| 2011/0103312 A1* | 5/2011 | Mickle | G06K 19/0713 |
| | | | 340/10.33 |
| 2011/0298591 A1* | 12/2011 | Mickle | G06K 19/0723 |
| | | | 340/10.33 |
| 2021/0406632 A1 | 12/2021 | Hill et al. | |
| 2022/0151361 A1 | 5/2022 | Hill et al. | |

* cited by examiner

*Primary Examiner* — Sisay Yacob
(74) *Attorney, Agent, or Firm* — Schmeiser, Olsen & Watts LLP

(57) ABSTRACT

An electronic device, comprising: a wake-up source configured to receive an electronic communication from a remote electronic device and generate a wake-up signal indicating a receipt of the electronic communication; a microcontroller configured to generate a power control signal indicating a receipt of power by the microcontroller by a power source; and a power conditioning circuit that processes the wake-up signal and the power control signal and provides the power from the power source to the microcontroller when at least one of the wake-up signal and the power control signal is in an enable state.

14 Claims, 6 Drawing Sheets

300

302  RECEIVE COMMUNICATION

304  ENABLE POWER COND. CIRCUIT WITH WAKE-UP SIGNAL

306  PROVIDE POWER TO CIRCUIT

308  SEND CONTROL SIGNAL TO POWER COND. CIRCUIT

310  INACTIVATE WAKE-UP SIGNAL

312  MCU PROCESS COMPLETE?

YES

314  INACTIVATE CONTROL SIGNAL

316  RETURN TO SLEEP MODE

RADIO FREQUENCY (RF) POWER CONDITIONING FOR WAKE-UP CIRCUIT

CROSS-REFERENCE TO RELATED APPLICATIONS

This application claims priority to U.S. Provisional Patent No. 63/430,592, titled "Radio Frequency (RF) Power Conditioning for Wake-Up Circuit" and filed Dec. 6, 2022, the entirety of which is incorporated by reference herein for all purposes. This application is related to U.S. Pat. No. 11,107, 337, titled "Article Identification and Location Device and Systems and Methods of Using Same," filed Jun. 3, 2020 and issued Aug. 31, 2021, U.S. Nonprovisional application Ser. No. 17/398,038 titled "Article Identification and Location Device and Systems and Methods of Using Same," filed Aug. 10, 2021, and U.S. Nonprovisional application Ser. No. 17/588,993 titled "Article Identification and Location Device and Systems and Methods of Using Same," filed Jan. 31, 2022, the entirety of each of which is incorporated by reference herein for all purposes.

FIELD OF THE INVENTION

The invention relates generally to electronic devices, and more specifically to radio frequency (RF) wake-up features for power management devices, systems, and methods for electronic devices.

BACKGROUND

Modern battery powered electronic devices ranging from Internet-of-Things (IoT) devices to smartphones or other devices with coin-cell batteries often employ a radio frequency (RF) wake-up feature to reduce power consumption and extend the battery life of the devices. Passive RF receivers can operate from the electromagnetic waves received in an incoming signal, for example, from an RFID reader or the like, and therefore requires little or no power from the device battery. Nevertheless, conventional designs typically include some components such as the microcontroller, or MCU, to be battery powered, while other components are powered with ambient energy or incoming signal.

Many passive RF receivers have a copper trace on a printed circuit board (PCB) that is configured to provide a signal to the MCU when communications are received from the receiver's antenna so that the MCU can be placed in a sleep mode and awakened by the signal. However, the MCU and peripheral electronic components and/or other circuits in the device may receive a small amount of power while in a sleep mode. The amount of power scales with the number of components and other circuits resulting in inefficient power consumption, which draws on the battery regardless of whether the electronic device is in a minimum power consumption mode.

SUMMARY

All examples and features mentioned below can be combined in any technically possible way.

In one aspect, an electronic device comprises a wake-up source configured to receive an electronic communication from a remote electronic device and generate a wake-up signal indicating a receipt of the electronic communication; a microcontroller configured to generate a power control signal indicating a receipt of power by the microcontroller by a power source; and a power conditioning circuit that processes the wake-up signal and the power control signal and provides the power from the power source to the microcontroller when at least one of the wake-up signal and the power control signal is in an enable state.

In some embodiments, the electronic device is an electronic tag.

In another aspect, an electronic device, comprises a first transceiver having a first antenna; a second transceiver having a second antenna, wherein at least one of the first and second antennas receives an electronic communication from a remote electronic device and in response at least one of the first and second transceivers generates a wake-up signal; a microcontroller configured to generate a power control signal indicating a receipt of power by the microcontroller by a power source; and a power conditioning circuit that processes the wake-up signal and the power control signal from the microcontroller and provides the power from the power source to the microcontroller.

In some embodiments, the electronic device is an electronic tag.

In some embodiments, the power conditioning circuit disables the microcontroller when it processes a disable signal in response to the wake-up signal and the power control signal indicating an inactive state.

In another aspect, a method for reducing an energy consumption of an electronic tag, the method comprises receiving, by at least one transceiver of the electronic tag, an electronic communication; outputting, by the at least one transceiver, a first signal to a power conditioning circuit; and activating a microcontroller in response to a receipt by the power conditioning circuit the first signal.

In some embodiments, the method further comprises outputting, by the microcontroller, a second signal to the power conditioning circuit; and providing a source of power to the microcontroller in response to a receipt by the power conditioning circuit of at least one of the first signal or the second signal.

In another aspect, an electronic device comprises a power source configured to provide power to the electronic device; at least one processor in a sleep mode wherein the at least one processor does not receive the power provided by the power source; a first circuit in communication with the at least one processor, the first circuit being configured to generate a wake-up signal; a second circuit in communication with the first circuit to receive the wake-up signal therefrom and in communication with the at least one processor, the second circuit being configured to enable power from the power source to pass to the at least one processor in response to receiving the wake-up signal from the first circuit, wherein, in response to receiving power from the power source, the at least one processor is configured to send a control signal to the second circuit that causes power to continue to pass to the at least one processor even if the first circuit ceases to generate the wake-up signal.

In some embodiments, the power source includes a battery.

In some embodiments, the first circuit is an active or passive RFID receiver or transceiver.

In some embodiments, the first circuit is a near-field communication receiver or transceiver.

In some embodiments, the electronic device further comprises a third circuit that is in communication with the first circuit to receive the wake-up signal therefrom and is in communication with the at least one processor to receive the control signal therefrom, the third circuit being configured to cause the second circuit to cause the power from the power source to pass to the at least one processor upon receiving either or both the wake-up signal and control signal.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
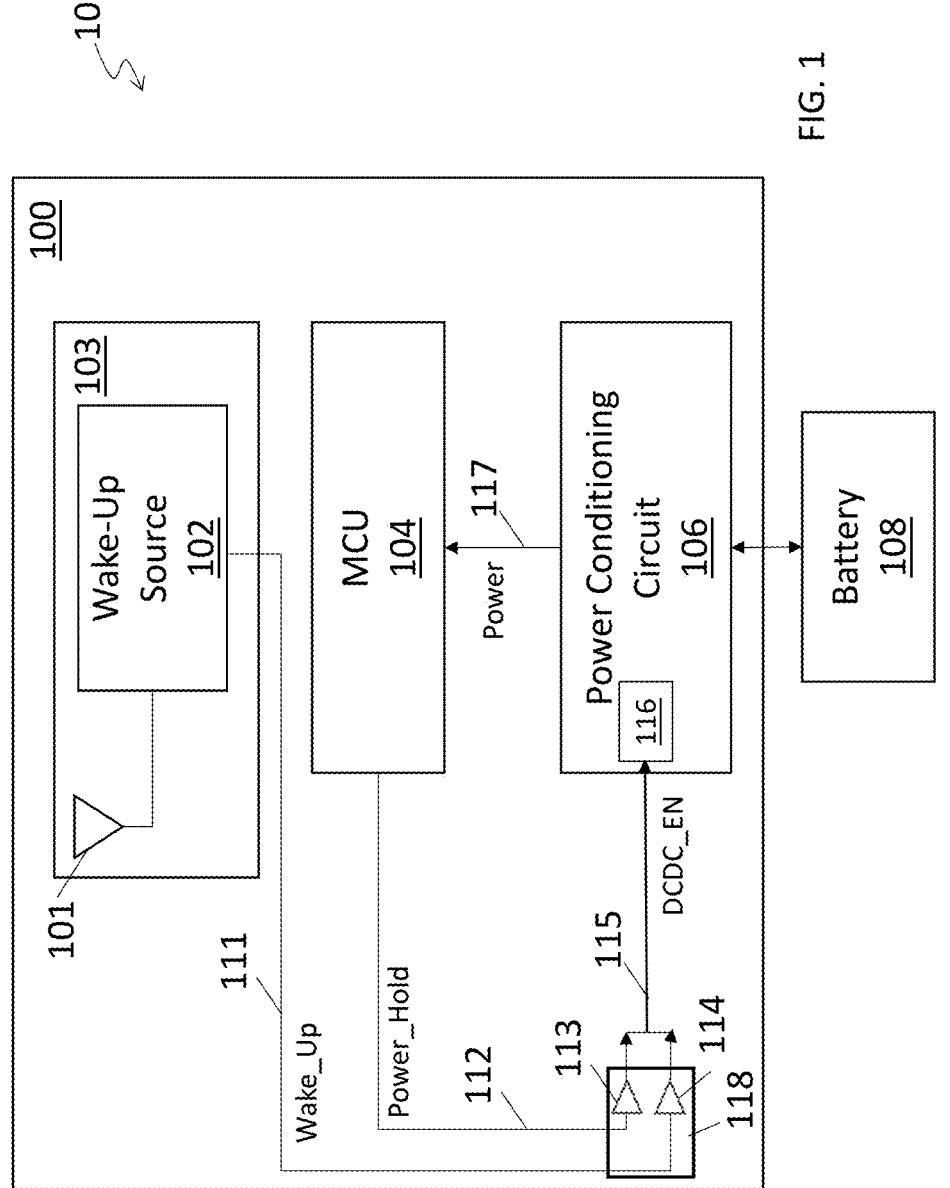
FIG. 1 shows a block diagram of an electronic device, in accordance with some embodiments.

FIG. 1 shows a block diagram of an electronic device 10 that includes a power management circuit 100 that provides a source of gated power for at least one transceiver 103 having a wake-up source 102, which can place other circuits of the device 10 such as an MCU 10 in a sleep mode when not operating, or wake-up mode when the device 10 is in use. In some embodiments, the transceiver 103 includes a receiver and a transmitter for communicating data via an antenna 101 with an external electronic device such as an RFID reader. The wake-up source 102 can include a passive circuit that collects energy from electromagnetic waves in the incoming radio signal. In some embodiments, the wake-up source 102 can include an ultra-low power or passive sensor, Reed switch, or related electronic devices from transmitting and/or receiving electronic communications. The wake-up source 102 can therefore be activated without the need for a battery 108 of the device 10. In doing so, the power management circuit one hundred can reduce power drawn from the battery 108 of the device 10. In particular, the transceiver 103 can operate without the battery 108 when the wake-up source 102 is in a sleep mode (described below). However, when the wake-up source 102 is in a wake-up mode, the wake-up source 102 may require additional features not otherwise used in the sleep mode, in which case the power management circuit 100 can provide power from the battery 108 to the wake-up source 102.

In one embodiment, the electronic device 10 is constructed as a small portable Internet-of-Things (IOT) device, for example, an RFID and/or near-field communication (NFC) electronic tag, label, or the like, for example. The electronic device 10, or more specifically, at least the wake-up circuit, can be implemented on an E-Ink luggage tag or other electronic device having an electronic display. Although a battery 108 is described by way of example, in other embodiments, the power management circuit 100 can operate with other power sources, such as an alternating current (AC) source or renewable energy source such as a solar cell, wind turbine, and so on. Although not shown, the electronic device 10 can include other power-consuming components such as an electronic display such as an E Ink display, peripheral device interfaces, data storage such as memory, and so on. The RF transceiver 103 can communicate wirelessly via its antenna 101 with other electronic devices using conventional wireless technologies such as BLUETOOTH® and WIFI®. The antenna 101 can be an on-chip or printed circuit board (PCB) dipole antenna or the like. A PCB antenna may have a dimension such as 54×27 mm, but not limited thereto. The antenna 101 is configured to receive an RF signal communication or the like as part of a mobile communication with another electronic device such as an RFID reader which can be used by the wake-up source 102 to provide wake-up signals to one or more processors such as the MCU 104, which may be a Raspberry PI microcontroller or the like, but not limited thereto. The MCU 104 may include one or more processors comprising hardware, software, or a combination thereof to govern specific operations of embedded systems of the electronic device 10. In some embodiments, the antenna 101 may be used to communicate with an RFID reader or the like, for example, receiving RF signals from the reader. For example, the antenna 101 may receive an electronic signal from an associated RFID reader (not shown) indicating that a communication session with the electronic device 10 is desired. The wake-up source 102 can also include circuitry that is constructed and arranged on a printed circuit board (PCB) or the like for coexisting with the antenna 101. The transceiver 103 including the wake-up source 102 may include suitable circuitry known in the art, such as passive circuitry and/or circuitry powered by the battery 108 response to receiving an RF signal received by the antenna 101. As described above, the battery 108 may provide power to the wake-up source 102 and/or MCU 104. However, the battery 108 or other power source may provide a source of voltage to other device components such as sensors or transducers such as light-emitting diodes (LEDs), electronic display, and so on.

The wake-up source 102 can be in electronic communication with a power conditioning circuit 106 and can provide wake-up signals (Wake_Up) via a PCB circuit trace line 111, also referred to as a power control signal line or connector, to the power conditioning circuit 106 when an electronic communication with the electronic device 10 is desired. The power conditioning circuit 106 can be disabled or otherwise powered down in a default state. The wake-up signals can enable the power conditioning circuit 106, i.e., change the default state to a power-on or enable state. In some embodiments, the power conditioning circuit 106 includes a DC-DC converter that receives a source of DC voltage from the battery 108 and regulates it for output to the MCU 104.

The power conditioning circuit 106 can be coupled between the MCU 104 and the battery 108 to selectively provide a source of power from the battery 108 to the MCU 104 when the power conditioning circuit 106 is placed in a power-on or enable state. In other embodiments, a gate or other logic circuit is between the battery 108 and the MCU 104 and controls a source of power from the battery 108 to the MCU 104. Here, the gate can be controlled by the power conditioning circuit 106, which can be conductively coupled to the gate. In some embodiments, the power conditioning circuit 106 can allow for operation from the battery 108 with an input voltage, for example, ranging from 1.5V-6V. When enabled in a power-on or enable state, the power conditioning circuit 106 can supply the device 10 with a predetermined amount of regulated power, for example, 60 mW or other amount determined by the limitations of the battery 108. In some embodiments, the power conditioning circuit 106 is used to power only the circuits of the MCU 104. In other embodiments, the power conditioning circuit 106 can power some or all circuits of the device 10, i.e., electronic components in addition to the MCU 104 such as LEDs, an E Ink display, and so on.

In particular, the power conditioning circuit 106 can be enabled and disabled by a control signal (DCDC_EN). When the control signal (DCDC_EN) is in a first, e.g., high, state, the control signal enables the power conditioning circuit 106 and in turn can provide power to the MCU 104 and/or other circuit components of the electronic device 10. When the control signal is in a second, e.g., low, state, the control signal disables the power conditioning circuit 106, whereby power cannot be provided to the circuit, including the MCU 104.

In some embodiments, the control signal (DCDC_EN) includes a combination of a wake-up signal (Wake_Up) received from the wake-up source 102 and a power control signal (Power_Hold) received from the MCU 104. The wake-up signal (Wake_Up) and power control signal (Power_Hold) are connected such as one of the signals is pulled high, the control signal (DCDC_EN) is in a first state for enabling the power conditioning circuit 106. The wake-up signal (Wake_Up) can have a low state in the absence of an RF signal received by the transceiver 103. When an RF signal is detected, then the wake-up signal (Wake_Up) can transition to a high state. In doing so, the control signal (DCDC_EN) is pulled high, and the power conditioning circuit 106 provides power to the MCU 104 on line 117. Accordingly, PCB circuit trace lines 111, 112 or the like carrying the wake-up and power control signals, respectively, are connected to a line 115, e.g., circuit trace line, carrying the control signal (DCDC_EN) such that the control signal (DCDC_EN) has a high state or a low state to the power conditioning circuit 106 depending on the state of the wake-up (Wake_Up) and power control (Power_Hold) signals. A first diode 113 may be on the power control signal line 111. A second diode 114 may be on a line 112, referred to as a wake up signal line. In some embodiments, the first diode 113 and second diode 114 may be part of a logic circuit 118. In other embodiments, the logic circuit 118 may include other electronic components for performing control-related operations, for example, transistors for controlling which of the wake-up (Wake_Up) and power control (Power_Hold) signals are to be output to the power conditioning circuit 106. The power conditioning circuit 106 may include an internal pulldown circuit 116 including a resistor or the like that pulls the control signal down when neither the wake-up (Wake_Up) nor power control (Power_Hold) signal is in a high state. This passive circuit configuration obviates the need for power-consuming active circuits.

For example, when the MCU 104 does not receive power, the state of its outputs, e.g., via general purpose input/output (GPIO) pins, can be defined by an external pull element such as a pull-up or pull-down resistor 116 of the power conditioning circuit 106. For example, the control signal (DCDC_EN) may have an internal pull-down, where in the absence of an external pull element the control signal has a default low state. The MCU 104 may store instructions to pull the wake up signal line connected to a GPIO pin of the MCU 104 that transmits the power control (Power_Hold) signal in a high state. Because the control signal (DCDC_EN) is controlled by the wake-up signal (Wake_Up) and the MCU's GPIO signal, i.e., the power control (Power_Hold) signal, for example, in an OR relationship, where only one of the signals must be high, even after the RF_WAKEUP signal returns to low, the DCDC_EN will remain high, as long as the MCU holds its GPIO signal high. After the MCU has completed any required work, it can then pull its GPIO low, pulling DCDC_EN low, and removing power from itself, where the MCU 104 returns to the default state.

As described above, the wake-up source 102 does not require power to operate. During operation, the expected behavior of the device 10 is that while the device 10 is in a sleep mode, i.e., in the default state, the power conditioning circuit 106 is disabled and no power is provided to the circuit, the wake-up source 102 (which does not require power to operate) will pull the line high, for example, when the antenna 101 receives a wake-up command. In response, the control signal (DCDC_EN) enters the first state for enabling the power conditioning circuit 106, which in turn provides power to the circuit. The MCU 104 receives the power after which it is enabled and outputs the power control signal (Power_Hold) in a high state to pull the line high as well. Even when the wake-up signal (Wake_Up) is low after the source of the wake-up lapses, power will remain available to the circuit because the power hold signal (Power_Hold) is high until the MCU 104 determines according to predetermined criteria that it is time to return to a sleep mode.

Figure 2:
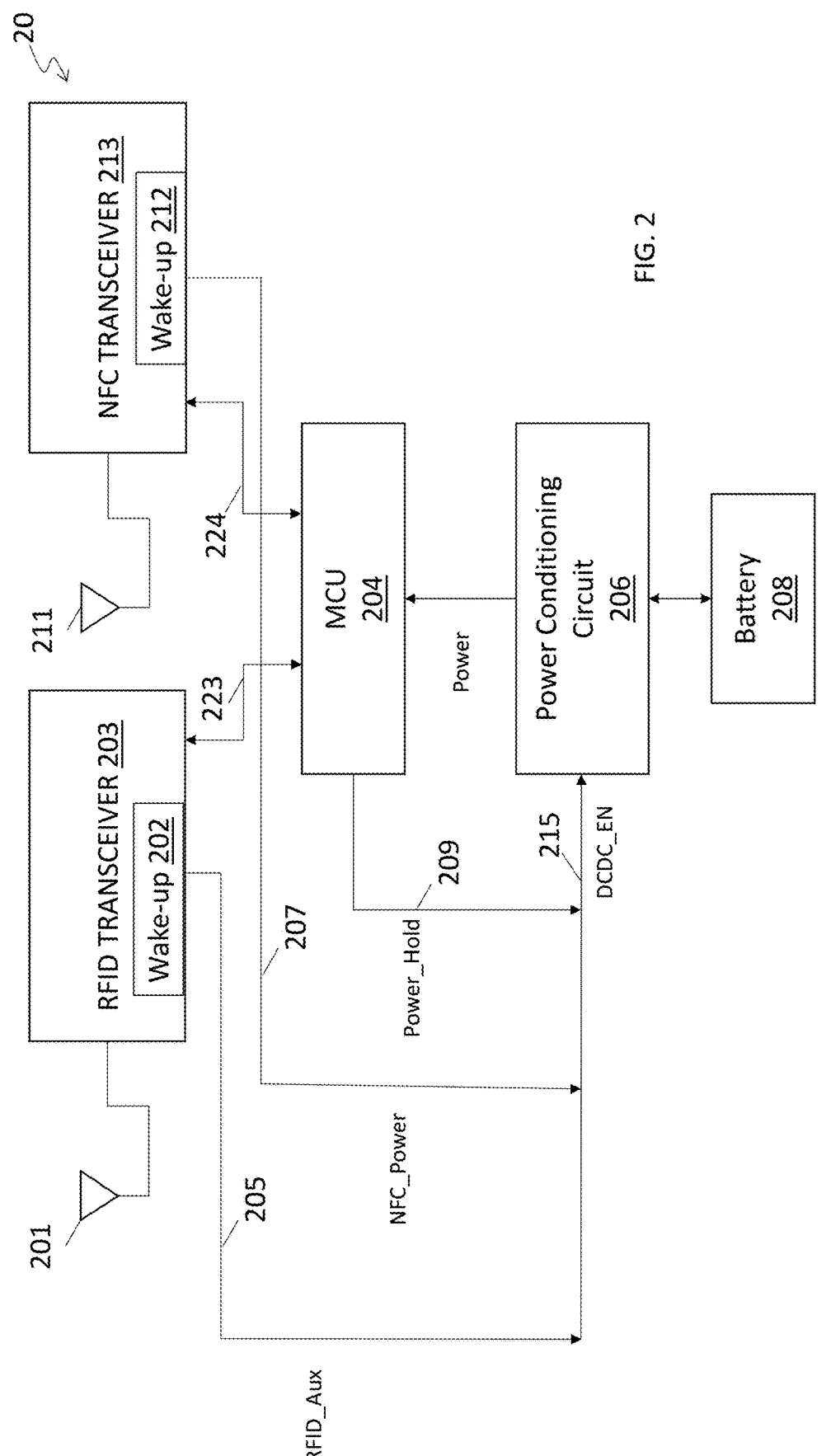
FIG. 2 shows a block diagram of an electronic device, in accordance with other embodiments.

FIG. 2 shows a block diagram of an electronic device 20, in accordance with other embodiments. The electronic device 20 may be similar to the electronic device 10 of FIG. 1, for example, constructed in some embodiments as an RFID electronic tag, IoT device, and so on. Some or all of the electronic components of the electronic device 20 can be powered by a battery 208 or other power source, for example, in a similar manner to the electronic device 10 of FIG. 1. For example, the battery 208 may provide power to on-board microcontrollers such as the MCU 204, sensors or transducers such as light-emitting diodes (LEDs), an electronic display such as an E Ink display, and so on.

The electronic device 20 of FIG. 2 can include at least two different RF communication circuits, e.g., transceivers 203, 213, each having a wake-up circuit 202, 212, respectively, and each capable of operating passively independently of the other. For example, the electronic device 20 can include a first line 223, or connector, extending between an MCU 204 to an RFID transceiver 203 having a first antenna 201 and a second line 224, or connector extending between the MCU 204 to an NFC transceiver 213 having a second antenna 211. A high signal (RFID_Aux) can be transmitted from the wake-up circuit 202 of the RFID transceiver 203 to the power conditioning circuit 206 via a PCB circuit trace line 205 when a communication signal triggering a wake-up operation is received at the first antenna 201. Similarly, the NFC transceiver 213 can have a PCB circuit trace line 207 on which a high signal (NFC_Power) can be transmitted from the wake-up circuit 212 of the NFC transceiver 213 to the power conditioning circuit 206 when a communication signal triggering a wake-up operation is received at the second antenna 211. In some embodiments, the lines 205, 207 can be connected to the enable pin of the power conditioning circuit 206, which can gate power to the remainder of the circuit(s) of the electronic device 20. Although not shown, passive components such as resistors or the like can permit for the control signal (DCDC_EN) to be output to the power conditioning circuit 206 in response to a combination of the signals (RFID_Aux, NFC_Power, and Power_Hold) via lines 205, 207 209, respectively, at least one of which is required to be pulled high in order to activate the power conditioning circuit 206. In doing so, the lines 205, 207, 209 can be connected to the line 215 having the control signal (DCDC_EN) such that the control signal (DCDC_EN) has a high state or a low state to the power conditioning circuit 206 depending on the state of the signals (RFID_Aux, NFC_Power, Power_Hold). In some embodiments, the RFID_Aux, NFC_Power, and Power_Hold signals can be coupled the control signal (DCDC_EN) to the power conditioning circuit 206, where any of these signals can enable the power conditioning circuit 206, e.g., change from a sleep mode to a wake-up mode. Similar to FIG. 1, the Power_Hold line is controlled by the MCU 204 and allows it to keep the circuit awake after the RF communications to the transceivers subside until it has completed processing new information. In some embodiments, the Power_Hold line 209 can return the circuit to the sleep mode. In doing so, after an antenna 201, 211 receives a wake-signal, the MCU 204 expects to receive a packet of data from the first connector 223 of the RFID transceiver 203 or the second connector 224 of the NFC transceiver 213. After receipt of the data, the MCU 204 may process a set of instructions stored in a memory device. For example, the electronic device 20 may include an E Ink display (not shown) that must be updated to display information pertaining to a user operation. After the E Ink display is updated, the MCU 204 may determine that the operation at hand is completed and in doing so the electronic device 20 may enter a sleep mode. In a related example, if the packet is not received as expected by the MCU 204, the MCU 204 may store a timeout value that when expired automatically causes the MCU 204 to enter the sleep mode. While in the sleep mode, the power conditioning circuit 206 does not provide power to the MCU 204 and/or the other electronic components capable of receiving power such as the abovementioned E Ink display, which are then inactivated.

Figure 3:
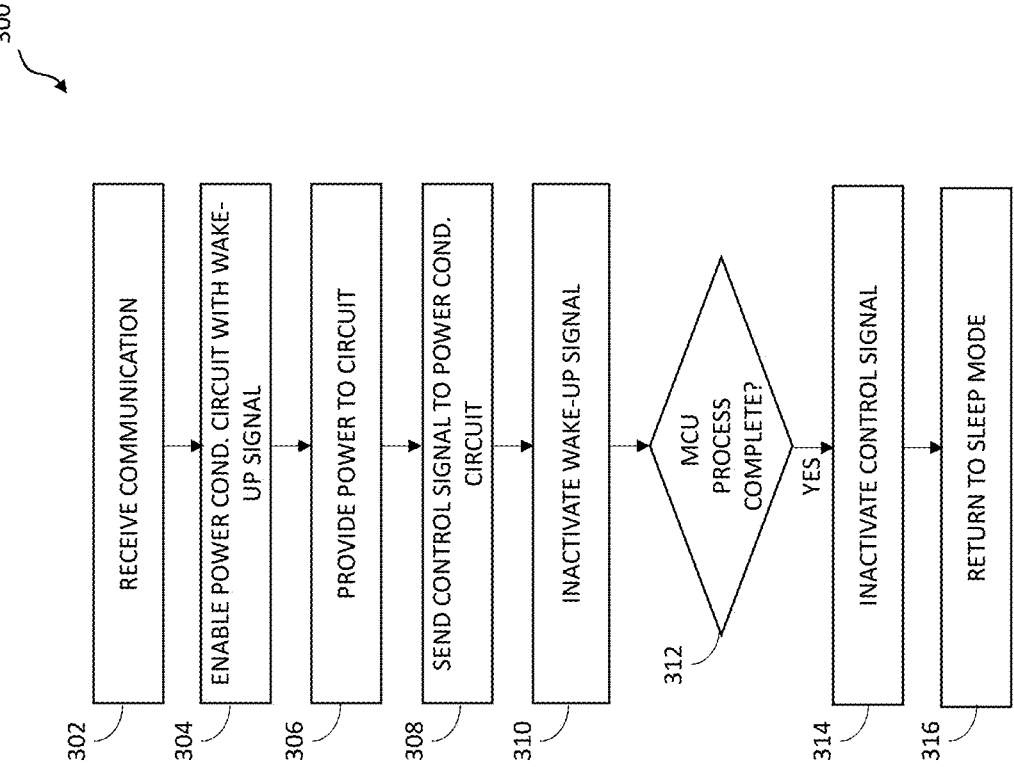
FIG. 3 shows a flow diagram of a method for managing power in an electronic device having a wake-up circuit, in accordance with some embodiments.

FIG. 3 is a method 300 for managing power in an electronic device having a wake-up circuit, in accordance with some embodiments. The electronic device, or more specifically, at least the wake-up circuit, can be implemented on an E-Ink luggage tag or other electronic device having an electronic display. Although the method 300 refers to the electronic device 10 of FIG. 1, embodiments of the method 300 may equally apply to elements of the electronic device 20 of FIG. 2.

Prior to performing the method 300, the electronic device 10 is in sleep mode. Accordingly, the MCU 104 does not receive a source of power from the battery 108 due to the power conditioning circuit 106 preventing the power from being received by the MCU 104. At step 302, an electronic communication is received by the wake-up source 102 via its antenna 101 from a remote electronic device such as an RFID reader or the like. In other embodiments, shown in FIG. 2, an electronic communication is an NFC communication received via antenna 211 from an NFC-compliant electronic device such as a mobile phone. In other embodiments, the electronic device 10, 20 may include a button (either mechanical or displayed at an E Ink display of the device, which can be used to wake up the device to attempt to communicate via another RF standard for which a passive wakeup is not available, for example, BLUETOOTH® and WIFI®. The electronic communication may be sent at a frequency that activates the wake-up source 102. For example, an incoming communication may be the range of UHF RFID: 860-960 MHz. In another example, an incoming communication may be at or about NFC: 13.56 MHz. Here, the electronic communication may be processed by the wake-up source 102 to generate a wake-up signal. In other embodiments, the electronic communication includes the wake-up signal which is received, processed, and output as a control signal by the wake-up source 102 to power conditioning circuit 106.

At step 304, the power conditioning circuit 106 is enabled by the wake-up signal (Wake_Up). In doing so, at step 306, the power conditioning circuit 106 can distribute power discharged from the battery 108 to the MCU 104 of the electronic device 10.

At step 308, in response to waking up, the MCU 104 sends a power control signal (Power_Hold) to the power conditioning circuit 106. This power control signal (Power_Hold) signal can be gated by a logic circuit 118 (internal or external to the power conditioning circuit 106) such as a diode 113. In some embodiments, the control signal (DCDC_EN) produced by the logic circuit, e.g., diodes 113 and/or 114, is one of or a combination of the power control signal (Power_Hold) from the MCU 104 and the wake-up signal (Wake_Up) from the wake-up source 102.

At step 310, the wake-up signal is inactivated, for example, when the wake-up source 102 ceases to receive via the antenna 101 a communication from an external device. At decision diamond 312, if the MCU 104 determines that a current operation is complete, then the method 300 proceeds to step 314, the MCU 104 inactivates the power control signal (Power_Hold), or outputs a signal that disables or otherwise causes the power conditioning unit 106 to prevent the battery 108 from providing power to the MCU 104 and other circuits of the device. At step 314, since neither the power control signal nor the wake-up signal is activated, the power conditioning circuit 106 is disabled, e.g., by a low value provided on the line 115 from the logic circuit and the rest of the circuit, i.e., those electronic components such as the MCU 104 receiving power from the battery 108 gated by the power conditioning circuit 106, enters the sleep mode.

Figure 4:
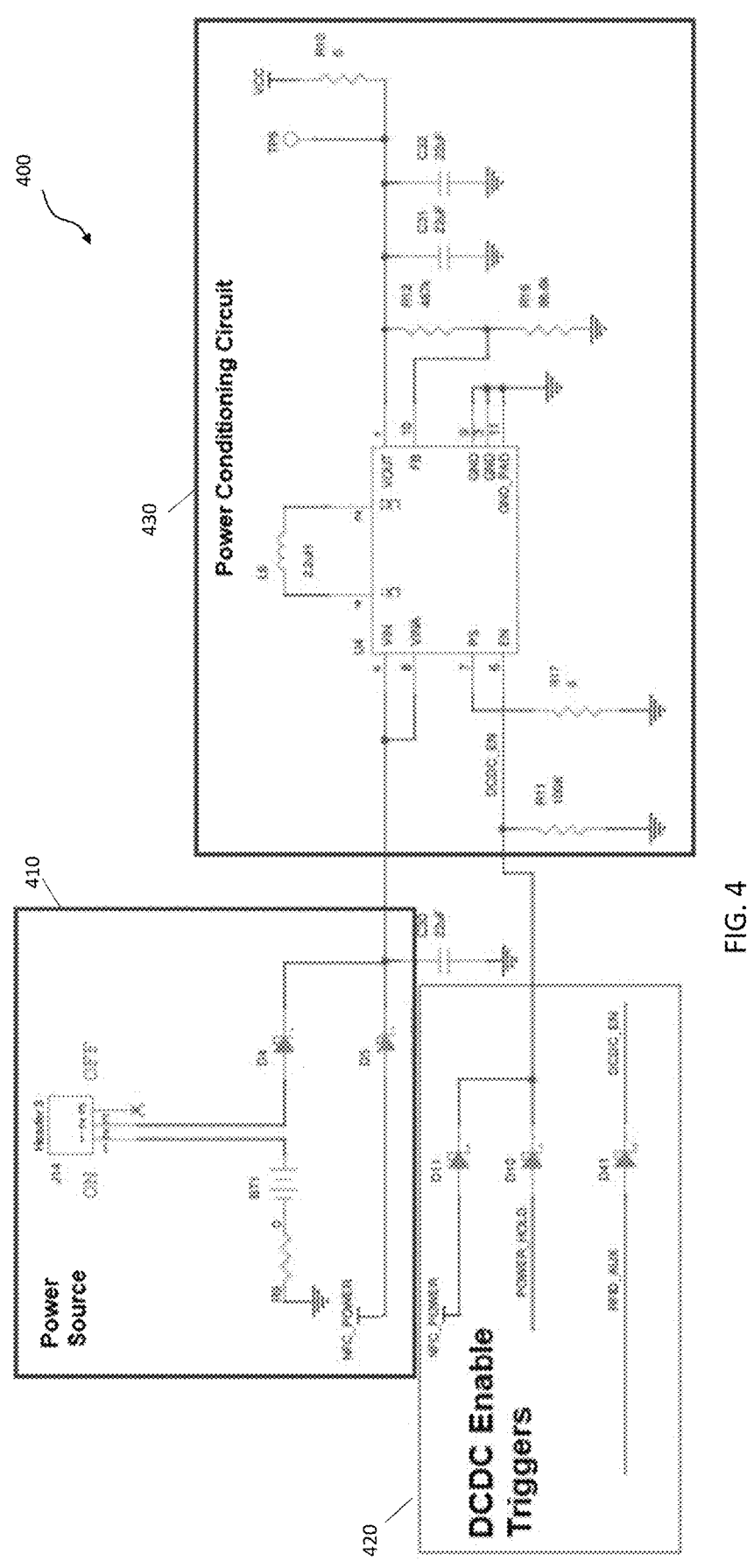
FIG. 4 shows a diagram of a DC-DC converter of a power conditioning circuit, in accordance with some embodiments.
Figure 5:
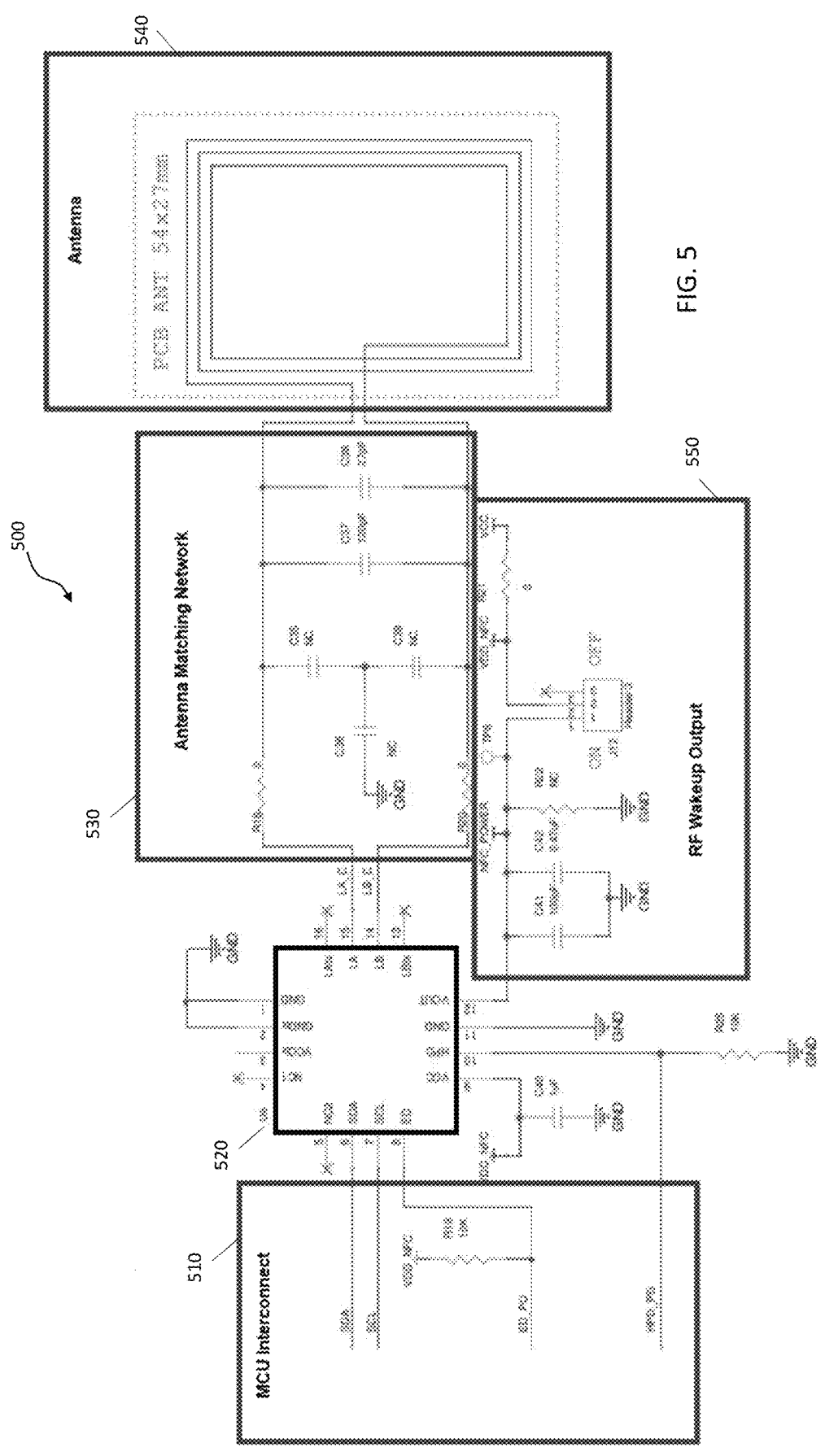
FIG. 5 shows a diagram of an RF wake-up circuit, in accordance with some embodiments.
Figure 6:
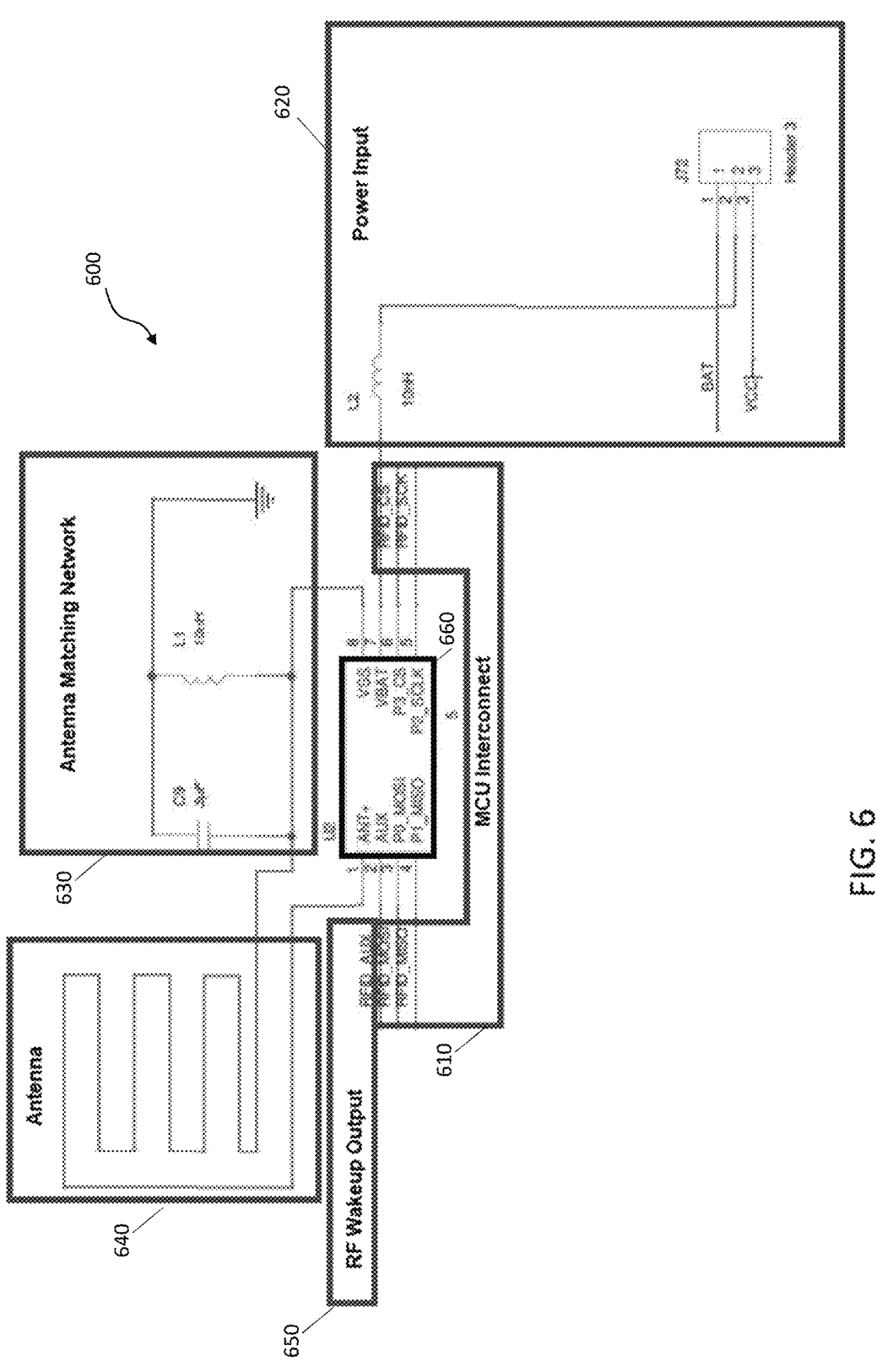
FIG. 6 shows a diagram of an NFC transceiver, in accordance with other embodiments.

FIGS. 4-6 are various circuits of the electronic device of FIGS. 1-3, in accordance with some embodiments.

FIG. 4 shows a diagram of a DC-DC converter 400 of a power conditioning circuit, in accordance with some embodiments. The converter 400 can be implemented in the electronic device 20 shown and described with reference to FIG. 2. As shown, some embodiments of the DC-DC converter 400 include a power source 410, a DC-DC enabling trigger circuit 420, and a power conditioning circuit 430. The power conditioning circuit 430 may be similar to or the same as a power conditioning circuit described in FIGS. 1-3, but not limited thereto. Details are not repeated for brevity. The DC-DC enabling trigger circuit 420 can provide a control signal (DCDC_EN), for example, described above, to the power conditioning circuit 430 in response to a combination of a NFC power signal, power hold signal, and an RFID aux signal, for example, described in FIGS. 1-3.

FIG. 5 shows a diagram of an RF wake-up circuit 500, in accordance with some embodiments. The wake-up circuit 500 can be similar to or the same as a wake-up circuit 202, 212 in FIG. 2; therefore, details are not repeated for brevity. As shown, some embodiments of the wake-up circuit 500 include an MCU interconnect circuit 510, a passive RFID chip 520, an antenna matching network 530, an antenna 540, and an RF wakeup output circuit 550.

FIG. 6 shows a diagram of an NFC transceiver 600, in accordance with other embodiments. The NFC transceiver 600 can be similar to or the same as a NFC transceiver 213 shown and described with respect to FIG. 2; therefore, details are not repeated for brevity. As shown, some embodiments of the wake-up circuit 500 include an MCU interconnect circuit 610, power input circuit 620, an antenna matching network 630, an antenna 640, an RF wakeup output circuit 650, and a passive RFID chip 660.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal, and the like are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. An electronic device, comprising:
   a wake-up source configured to receive an electronic communication from a remote electronic device and generate a wake-up signal indicating a receipt of the electronic communication;
   a microcontroller configured to generate a power control signal indicating a receipt of power by the microcontroller by a power source; and
   a power conditioning circuit that processes the wake-up signal and the power control signal and provides the power from the power source to the microcontroller when at least one of the wake-up signal and the power control signal is in an enable state, wherein the power conditioning circuit is configured to receive both the wake-up signal from the wake-up source and the power control signal from the microcontroller as separate input signals that are logically combined to control power delivery to the microcontroller.

2. The electronic device of claim 1, wherein the electronic device is an electronic tag.

3. The electronic device of claim 1, wherein the power conditioning circuit includes a logic circuit that combines the wake-up signal and the power control signal using diode logic to generate a control signal for enabling power distribution.

4. The electronic device of claim 1, wherein the electronic device further comprises:
   a first transceiver having a first antenna configured to receive at least one of NFC and RFID communications and generate a first wake-up signal; and
   a second transceiver having a second antenna configured to receive the at least one of NFC and RFID communications and generate a second wake-up signal,
   wherein the power conditioning circuit is configured to process at least one of the first and second wake-up signals from the first transceiver and the second transceiver independently to enable power delivery to the microcontroller.

5. The electronic device of claim 1, wherein the power conditioning circuit comprises a DC/DC converter disposed between a battery and the microcontroller, the DC/DC converter being disabled by default and configured to be enabled in response to a wake-up signal from the wake-up source, and further configured to remain enabled while a power control signal from the microcontroller is active, and to disable itself when both the wake-up signal and the power control signal are inactive, thereby maintaining a constant sleep-mode power consumption regardless of the number of peripheral components connected to the microcontroller.

6. An electronic device, comprising:
   a first transceiver having a first antenna;
   a second transceiver having a second antenna, wherein at least one of the first and second antennae receives an electronic communication from a remote electronic device and in response at least one of the first and second transceivers generates a wake-up signal;
   a microcontroller configured to generate a power control signal indicating a receipt of power by the microcontroller by a power source; and
   a power conditioning circuit that processes the wake-up signal and the power control signal from the microcontroller and provides the power from the power source to the microcontroller, wherein the power conditioning circuit is configured to receive both the wake-up signal from the wake-up source and the power control signal from the microcontroller as separate input signals that are logically combined to control power delivery to the microcontroller.

7. The electronic device of claim 6, wherein the electronic device is an electronic tag.

8. The electronic device of claim 6, wherein the power conditioning circuit disables the microcontroller when it processes a disable signal in response to the wake-up signal and the power control signal indicating an inactive state.

9. A method for reducing an energy consumption of an electronic tag, the method comprising:
   receiving, by at least one transceiver of the electronic tag, an electronic communication;
   outputting, by the at least one transceiver, a first signal to a power conditioning circuit; and
   activating a microcontroller in response to a receipt by the power conditioning circuit of the first signal;

wherein the power conditioning circuit is configured to receive the first signal including a wake-up signal from a wake-up source which is received from the microcontroller as an input signal separate from and combined with a second signal including a power control signal to control power delivery to the microcontroller.

10. The method of claim 9, further comprising:

outputting, by the microcontroller, the second signal to the power conditioning circuit; and providing a source of power to the microcontroller in response to a receipt by the power conditioning circuit of at least one of the first signal or the second signal.

11. An electronic device, comprising:

a power source configured to provide power to the electronic device;

at least one processor in a sleep mode wherein the at least one processor does not receive the power provided by the power source;

a first circuit in communication with the at least one processor, the first circuit being configured to generate a wake-up signal;

a second circuit in communication with the first circuit to receive the wake-up signal therefrom and in communication with the at least one processor, the second circuit being configured to enable power from the power source to pass to the at least one processor in response to receiving the wake-up signal from the first circuit, wherein, in response to receiving power from the power source, the at least one processor is configured to send a control signal to the second circuit that causes power to continue to pass to the at least one processor even if the first circuit ceases to generate the wake-up signal, the electronic device further comprising:

a third circuit that is in communication with the first circuit to receive the wake-up signal therefrom and is in communication with the at least one processor to receive the control signal therefrom, the third circuit being configured to cause the second circuit to cause the power from the power source to pass to the at least one processor upon receiving either or both the wake-up signal and control signal.

12. The electronic device of claim 11, wherein the power source includes a battery.

13. The electronic device of claim 11, wherein the first circuit is an active or passive RFID receiver or transceiver.

14. The electronic device of claim 11, wherein the first circuit is a near-field communication receiver or transceiver.

* * * * *